United States Patent
Yan et al.

(10) Patent No.: US 12,371,548 B2
(45) Date of Patent: Jul. 29, 2025

(54) COUPLING SYSTEM FOR SILICA CONTAINING RUBBER COMPOUNDS

(71) Applicant: The Goodyear Tire & Rubber Company, Akron, OH (US)

(72) Inventors: Yuan-Yong Yan, Copley, OH (US); Justin Yinket Che, Wadsworth, OH (US); Eric Sean Castner, Uniontown, OH (US); Paul Harry Sandstrom, Cuyahoga Falls, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 557 days.

(21) Appl. No.: 17/935,678

(22) Filed: Sep. 27, 2022

(65) Prior Publication Data
US 2024/0132697 A1  Apr. 25, 2024

(51) Int. Cl.
*C08K 3/36* (2006.01)
*C08K 5/00* (2006.01)

(52) U.S. Cl.
CPC .............. *C08K 3/36* (2013.01); *C08K 5/0025* (2013.01)

(58) Field of Classification Search
CPC ................................... C08K 3/36; C08K 5/00
USPC ....................................................... 524/856
See application file for complete search history.

(56) References Cited

U.S. PATENT DOCUMENTS

| | | |
|---|---|---|
| 3,768,537 A | 10/1973 | Creasey et al. |
| 5,064,901 A | 11/1991 | Machado |
| 5,395,891 A | 3/1995 | Obrecht et al. |
| 5,504,135 A | 4/1996 | Ardrizzi et al. |
| 5,672,639 A | 9/1997 | Corvasce et al. |
| 6,013,718 A | 1/2000 | Cabioch et al. |
| 6,103,808 A | 8/2000 | Hashimoto |
| 6,127,488 A | 10/2000 | Obrecht et al. |
| 6,133,364 A | 10/2000 | Obrecht et al. |
| 6,146,520 A | 11/2000 | Gupte et al. |
| 6,207,757 B1 | 3/2001 | Obrecht et al. |
| 6,242,534 B1 | 6/2001 | Obrecht et al. |
| 6,248,929 B1 | 6/2001 | Kaimai et al. |
| 6,372,857 B1 | 4/2002 | Obrecht et al. |
| 6,399,697 B1 | 6/2002 | Takasaki et al. |
| 6,410,816 B2 | 6/2002 | Takasaki et al. |
| 6,608,145 B1 | 8/2003 | Lin et al. |
| 6,936,669 B2 | 8/2005 | Halasa et al. |
| 7,968,636 B2 | 6/2011 | York et al. |
| 7,981,966 B2 | 7/2011 | Kobayashi et al. |
| 8,217,103 B2 | 7/2012 | Thiele et al. |
| 8,569,409 B2 | 10/2013 | Thiele et al. |
| 2001/0007049 A1 | 7/2001 | Takasaki et al. |
| 2001/0023307 A1 | 9/2001 | Kaimai et al. |
| 2002/0000280 A1 | 1/2002 | Scholl |
| 2002/0045697 A1 | 4/2002 | Sohnen et al. |
| 2004/0249048 A1 | 12/2004 | Mangeret |
| 2015/0148495 A1* | 5/2015 | Watanabe .............. C08K 5/37 525/329.3 |
| 2017/0247532 A1* | 8/2017 | Miller ..................... C08L 9/00 |
| 2018/0030190 A1 | 2/2018 | Mosaki |
| 2019/0055335 A1 | 2/2019 | Mecking |
| 2021/0222000 A1 | 7/2021 | Yamaji |

FOREIGN PATENT DOCUMENTS

| | | |
|---|---|---|
| EP | 0839891 B1 | 6/2004 |
| JP | 2002097369 | 4/2002 |
| JP | 2021172673 A | 11/2021 |
| WO | 2021196513 A1 | 10/2021 |

OTHER PUBLICATIONS

Extended European Search Report for Application No. 23199308.0, dated Jan. 31, 2024.

* cited by examiner

*Primary Examiner* — Deve V Hall
(74) *Attorney, Agent, or Firm* — Mandy B. Willis

(57) ABSTRACT

A sulfur-vulcanizable rubber compound comprises a silane functionalized diene elastomer, a dual silane coupling system, and a silica filler. The non-active sulfur containing silane coupling agent excludes an active sulfur moiety. The rubber compound is a reaction product of a siloxyl condensation reaction between the silane functionalized diene elastomer and the dual silane coupling system. The dual coupling system comprises a non-active sulfur containing silane coupling agent for reacting with an associated precipitated silica to produce a hydrophobic silica; and
  a crosslinking reagent for reacting with the non-active sulfur containing silane coupling agent and an associated polymer.

17 Claims, 3 Drawing Sheets

COUPLING SYSTEM FOR SILICA CONTAINING RUBBER COMPOUNDS

FIELD OF THE INVENTION

The present invention relates to a coupling system comprising a non-active sulfur containing mono-, bis-, or multi-functional coupling agent used with a thiol-based crosslinking reagent, and a rubber compound comprising the same. It finds particular application in conjunction with functional polymers and will be described with particular reference thereto. However, it is to be appreciated that the present exemplary embodiments are also amenable to other like applications.

BACKGROUND OF THE INVENTION

Silica is widely employed in tires to promote certain performance advantages. However, its hydrophilic surface makes it difficult to disperse in a polymer. One way to improve dispersion is to treat silica with an organosilane coupling agent, which links the silica and polymer in vulcanizable silica-filled rubber stocks. Typically, the coupling agent is bifunctional and is represented by the general formulae A-R-B, wherein moiety A (e.g., a silyl group) reacts with the silica surface and moiety B binds to the polymer. In conventional coupling agents, a sulfur is believed to be necessary for the cross-linkage to occur. Therefore, group B commonly includes a mercapto —SH or other groups (e.g., —SCN, —$S_n$) capable of providing a sulfur that will bond with the rubber polymer.

The coupling reactions between silica and these agents can be divided into two schemes: (1) the silanization modification reaction (hereinafter synonymously referred to as "hydrophobation") in which the triethoxysilyl group reacts with the silanol groups on the silica; and (2) a silane-polymer coupling reaction (hereinafter synonymously referred to as "crosslinking") in which the sulfur group reacts with the polymer under curing conditions to form the rubber-to-filler bonds.

Current silane technology is focused on the second scheme during which the B group enters into a coupling reaction with the double bonds of the polymer. A silica-silane polymer interphase is formed by the sulfur-polymer coupling reaction, which must be performed under specific temperature constraints or else scorching will occur.

In co-owned U.S. patent application Ser. No. 17/644,102, filed Dec. 14, 2021, titled NON-ACTIVE SULFUR CONTAINING FUNCTIONAL SILANES FOR SILICA COMPOUNDS, the contents of which are incorporated herein in their entirety, it was discovered that a coupling agent that excludes a sulfur moiety or a similar functioning moiety can be employed in rubber compounds formed from functionalized polymers. The '102 application discloses that, for a silane functionalized polymer, a silica-silane-polymer interphase can be formed by a siloxyl condensation reaction (—Si—O—Si-Polymer linkage).

Disclosed herein is a novel coupling system in which such coupling agent is used in combination with a crosslinking reagent to allow for a greater number of polymers (including, for example, nonfunctional polymers) to be used with the non-active sulfur containing silane coupling agent. As discussed infra, it was also discovered that the disclosed coupling system provides the unexpected benefit of removal and/or reduction of the aforesaid processing constraints.

SUMMARY OF THE INVENTION

One embodiment of the disclosure is directed to a coupling system for use in a vulcanizable silica-filled rubber composition. The coupling system comprises a non-active sulfur containing silane coupling agent, which is reactive with a precipitated silica to produce a hydrophobic silica. The coupling system further comprises a crosslinking reagent, which is reactive with the non-active sulfur containing silane coupling agent and a polymer. The coupling system is used to bond silica to rubber.

Another embodiment of the disclosure is directed to a vulcanizable silica-filled rubber compound. The rubber compound comprises a diene-based polymer and a precipitated silica filler. The rubber compound further comprises a non-active sulfur containing silane coupling agent and a crosslinking reagent. The non-active sulfur containing silane coupling agent comprises at least one end terminating group reactive with a hydroxyl group contained on the silica. The crosslinking reagent comprises at least one end terminating group reactive with a functional moiety contained on the non-active sulfur containing silane coupling agent and at least a second end terminating group reactive with the diene-based polymer.

Another embodiment of the disclosure is directed to a method for forming a rubber-to-filler bond in a vulcanizable silica-filled rubber compound. The method comprises the steps of (1) reacting a non-active sulfur containing silane coupling agent with a precipitated silica to generate a hydrophobic silica; and (2) reacting a multi-thol a crosslinking reagent with the non-active sulfur containing silane coupling agent and a diene-based polymer to generate the rubber-to-filler bond.

BRIEF DESCRIPTION OF THE DRAWINGS

The invention will be described by way of example and with reference to the accompanying drawings in which.

DETAILED DESCRIPTION OF THE INVENTION

Figure 1:
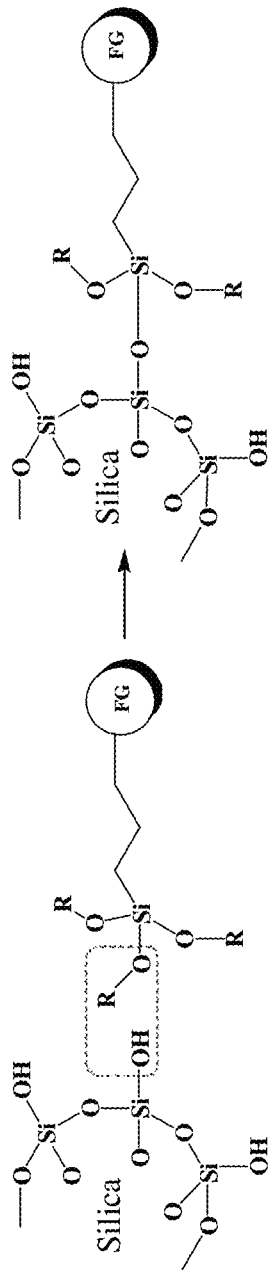
FIG. 1 shows the hydrophobation stage in an example two-step chemical reaction in which a starting non-active sulfur containing silane is used to generate a hydrophobic silica.

The preset invention relates to a coupling system that comprises a silane coupling agent, which excludes an active sulfur moiety, and a bi-functional or multi-functional thiol crosslinking reagent, which reacts with silane coupling agent and the polymer in lieu of the conventional silane-polymer coupling reaction.

In the conventional coupling reaction, the hydrophobation and crosslinking reactions are contemporaneous. It is now discovered that a non-active sulfur containing silane and a multi-thiol crosslinking reagent would allow for these steps to be performed independently and/or separately, thus placing fewer limitations on processing conditions. Furthermore, a wider selection of materials is available for use in vulcanizable silica-filled rubber compounds.

As used herein, the terms "rubber", "polymer" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

As used herein, except where context requires otherwise, the term "comprise" and variations of the term, such as "comprising", "comprises" and "comprised", are not intended to exclude further additives, components, integers, or steps.

As used herein, the term "non-active sulfur containing silane" refers to a silane coupling agent comprising at least one end terminating group reactive with a hydroxyl group contained on precipitated silica and at least one end terminating group reactive with a silane moiety contained on a functional polymer or crosslinking reagent.

As used herein, the term "crosslinking reagent" refers to a multi-thiol crosslinking reagent or compound comprising at least one thiol reactive with a functional moiety on the non-active sulfur containing silane and at least one thiol reactive with a functionalized or non-functionalized polymer. In one embodiment, the polymer can be a diene-based polymer. Thus, a sulfur-vulcanizable rubber compound comprises a diene polymer, a crosslinking reagent, a non-active sulfur containing silane coupling agent, and a silica filler.

The disclosed coupling system comprises two parts: (1) a non-active sulfur containing silane coupling agent; and (2) the crosslinking reagent. More particularly, the present disclosure separates the silica surface reaction into two controlled stages. In one embodiment, a silica-rubber chemical bond may be produced by a two-step reaction in which (1) a non-active sulfur containing silane coupling agent is reacted with a precipitated silica to generate a hydrophobic silica and (2) a crosslinking reagent is reacted with the non-active sulfur containing silane coupling agent and a diene-based polymer to generate the final rubber-to-filler bond.

Non-Active Sulfur Containing Coupling Agent

A critical aspect of the disclosure is the non-sulfur containing silane coupling agent. The coupling agent comprises at least one end terminating group reactive with a hydroxyl group contained on the silica filler and another moiety reactive with a thiol on the crosslinking agent.

In one embodiment the coupling agent is a dual-functional organosilane having the general formulae A-R-B. The A represents a moiety capable of bonding to a silica. The A group can be an alkoxy, cycloalkoxy, and phenoxy groups. The B group can be a vinyl-, cyano-, epoxy-, acryloxy-, methacryloxy-, cyclopentadienyl- or isocyanyl groups that is capable of bonding to a thiol, such as a thiol on the crosslinking reagent. The R represents a bifunctional group that is capable of connecting and bonding to A and B in a stable manner. In some embodiments, R may be a chemical bond directly between A and B, but generally R will be a hydrocarbon chain, a heteroatom-containing (O, N, P) hydrocarbon, or a ring group. The R group is preferably a hydrocarbon having from one to 10 carbon atoms. The hydrocarbon chain, however, could be longer and could be branched.

In one embodiment the coupling agent is a bifunctional organosilane having the general formulae A-R-A', which can be used as co-hydrophobation silanes. The A and A' each independently represent a moiety capable of bonding to both a silica and a crosslinking reagent. In this manner, each moiety has two leaving groups. In one embodiment, the leaving groups can be the same or different alkoxy, cycloalkoxy, and phenoxy groups. R represents a bifunctional group that is capable of connecting and bonding to A and A' in a stable manner. In some embodiments, R may be a chemical bond directly between A and A', but generally R will be a hydrocarbon chain, a heteroatom-containing (O, N, P) hydrocarbon, or a ring group. The R group is preferably a hydrocarbon having from one to 10 carbon atoms. The hydrocarbon chain, however, could be longer and could be branched.

In some embodiments, the R can contain a non-active sulfur in the hydrocarbon chain. The invention differs from conventional organosilanes to the extent that the sulfur is part of an active moiety.

Non-limiting examples of non-sulfur containing silanes are listed in the application Ser. No. 17/644,102, fully incorporated herein. Other non-limiting examples of silanes include:

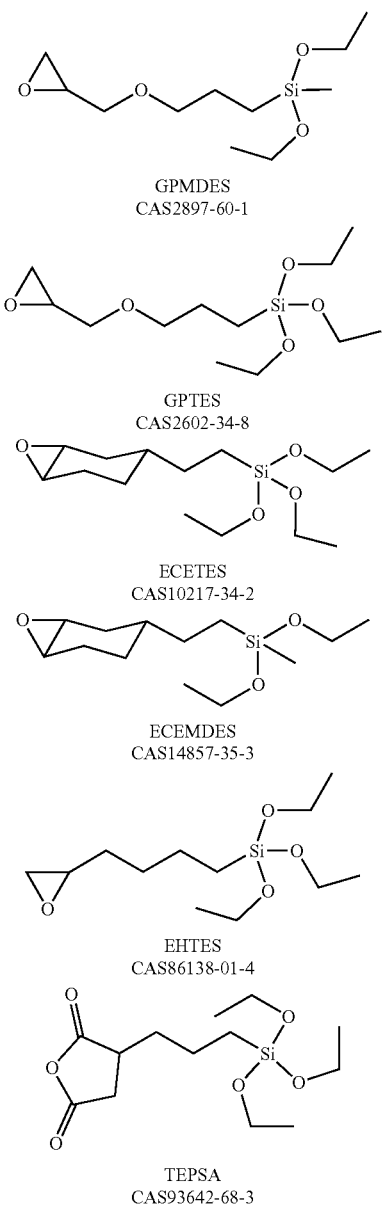

GPMDES
CAS2897-60-1

GPTES
CAS2602-34-8

ECETES
CAS10217-34-2

ECEMDES
CAS14857-35-3

EHTES
CAS86138-01-4

TEPSA
CAS93642-68-3

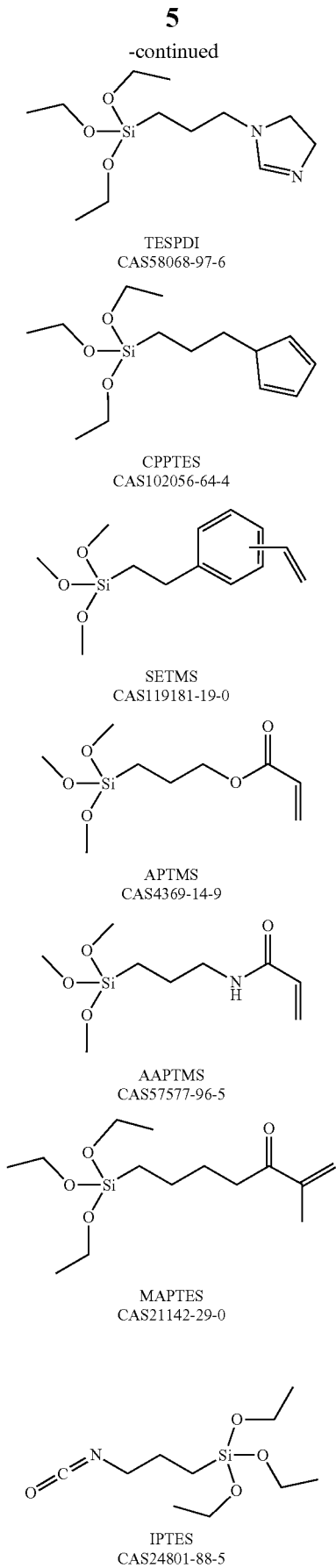

TESPDI
CAS58068-97-6

CPPTES
CAS102056-64-4

SETMS
CAS119181-19-0

APTMS
CAS4369-14-9

AAPTMS
CAS57577-96-5

MAPTES
CAS21142-29-0

IPTES
CAS24801-88-5

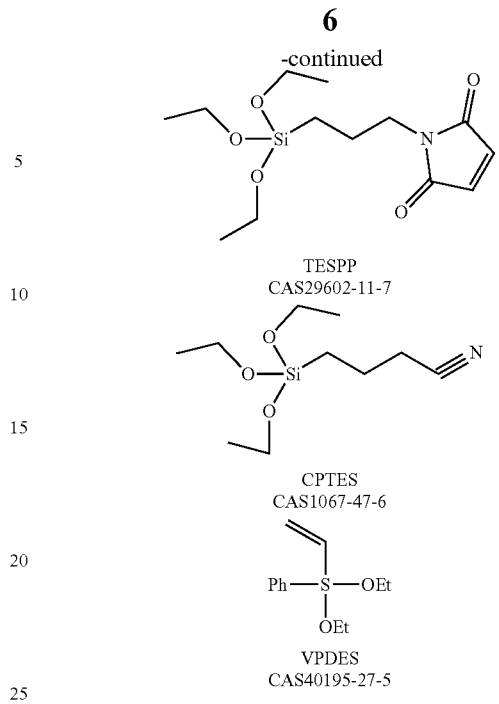

TESPP
CAS29602-11-7

CPTES
CAS1067-47-6

VPDES
CAS40195-27-5

Other commercially available non-sulfur silanes that can be used as co-hydrophobation silanes include: PhTES; EHETES; DMBAPTES; TESPEC; PAMTES; Bis_TESPA; TESPPEOU; OTES; and Bis_OTES.

In one embodiment, the rubber composition may include from about 0.1 to about 50 phr of coupling agent and, more preferably, from about 1 to about 30 phr of the silane coupling agent. In further embodiments, an additional coupling agent(s) can be employed in the rubber compound.

Crosslinking Reagent:

Another critical aspect of the disclosure is the crosslinking reagent. The crosslinking reagent comprises at least one end terminating group reactive with a functional moiety contained on the hydrophobized silica and, more particularly, the non-active sulfur containing silane coupling agent and another moiety reactive with the polymer.

In one embodiment the crosslinking agent is selected from dual-mercapto-containing chemicals having the general formula Q-R-Q'. The Q and Q' each independently represent a thiol-containing group. R represents a bifunctional group that is capable of connecting and bonding to Q and Q' in a stable manner. In some embodiments, R may be a chemical bond directly between Q and Q', but generally R will be a hydrocarbon chain or a heteroatom-containing (B, O, P, N) alkyl, aryl, ether, ester, or amide chain. The R group is preferably a hydrocarbon having from one to 10 carbon atoms. The hydrocarbon chain, however, could be longer and could be branched.

In one embodiment the crosslinking agent is a dual-mercapto-containing chemical having the general formula $R-(Q'')_n$, wherein $Q''$ represents a thiol-containing group(s) and $n \geq 2$.

Non-limiting examples of the crosslinking reagent include:

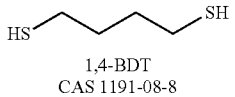

1,4-BDT
CAS 1191-08-8

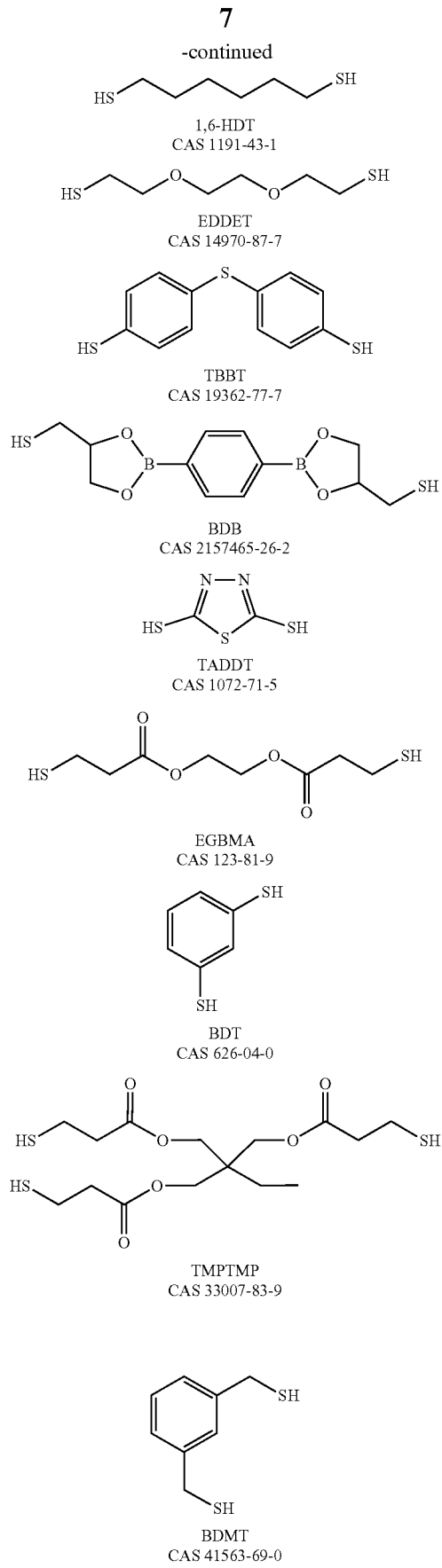

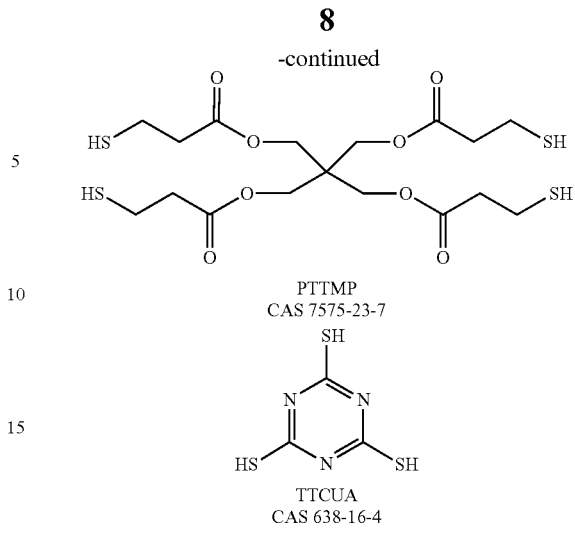

In one embodiment, the rubber composition may include from about 0.1 to about 20 phr of crosslinking reagent and, more preferably, from about 1 to about 10 phr of the crosslinking reagent. In the contemplated embodiment, the molar ratio of crosslinking reagent to non-active sulfur containing coupling agent is less than 1:1. In further embodiments, an additional coupling agent(s) can be employed in the rubber compound.

Reaction Scheme:

One aspect of the present disclosure is that it eliminates the conventional silane-polymer coupling reaction for rubber compounds employing an active-sulfur containing silane coupling agent. In the prior art reaction, the silane-polymer coupling reaction was performed under specific and limited temperature ranges to prevent scorching. The type of rubber polymer (e.g., NR, IR, SBR, BR or blends thereof) controlled the temperature range at which the reaction could be performed.

Instead, by employing the non-active sulfur containing coupling agent and the crosslinking agent, the silica-to-filler bond can be performed in two step chemical reaction: (1) a silanization reaction (hydrophobation) between the silica and the non-active sulfur containing silane coupling agent; and (2) a two-part crosslinking reaction between (a) the crosslinking reagent and the non-active sulfur containing silane coupling agent and (b) the crosslinking reagent and the polymer.

Figure 2:
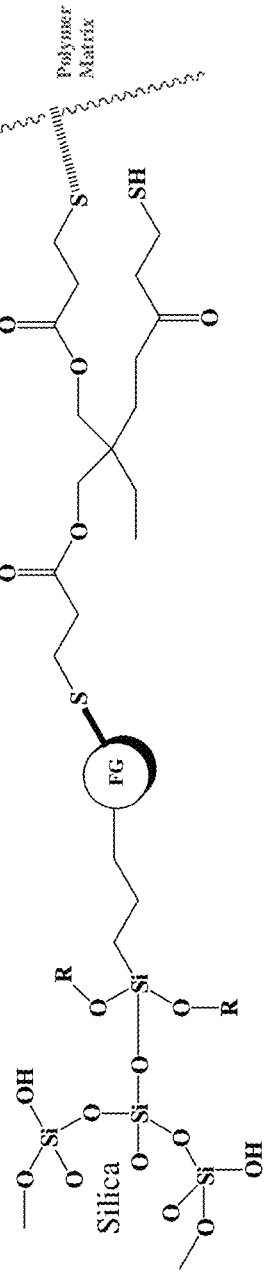
FIG. 2 shows the crosslinking stage, continuing as the second reaction step for the example shown in FIG. 1, in which Trimethylolpropane tris(3-mercaptopropionate) is the exemplary crosslinking reagent reacted with the hydrophobic silica to produce the rubber-to-filler bond.

FIG. 1 shows the hydrophobation stage in an example two-step chemical reaction in which a starting non-active sulfur containing silane is used to generate a hydrophobic silica. FIG. 2 shows the crosslinking stage, continuing as the second reaction step for the example shown in FIG. 1, in which Trimethylolpropane tris(3-mercaptopropionate) is the exemplary crosslinking reagent reacted with the hydrophobic silica to produce the rubber-to-filler bond.

In one embodiment, the coupling system is for use with a sulfur-vulcanizable rubber compound. The rubber compound further comprises at least one polymer and, more particularly, a diene-based Various conjugated diene-based elastomers may be used for the rubber compound such as, for example, polymers and copolymers of at least one of isoprene and 1,3-butadiene and of styrene copolymerized with at least one of isoprene and 1,3-butadiene, and mixtures thereof.

Representative of such conjugated diene-based elastomers are listed in U.S. patent application Ser. No. 17/644,102, and can comprise at least one of polyisoprene (natural and synthetic and including cis-1,4-polyisoprene); polybutadiene (including cis-1,4-polybutadiene); styrene/butadiene copolymers; isoprene/butadiene copolymers; styrene/isoprene/butadiene terpolymers; butyl rubber; neoprene (polychloroprene), halobutyl rubber such as chlorobutyl rubber or bromobutyl rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers.

In practice, the preferred rubber polymer (to which the silica filler is bonded) is polybutadiene, a styrene butadiene copolymer or a butadiene-styrene-isoprene copolymer. The rubber compound can comprise more than one rubber polymer. The additional polymer can be a natural rubber, polyisoprene or polybutadiene. In one embodiment, the rubber polymer is not functionalized but is still reactive with the crosslinking reagent. In one embodiment, the rubber polymer is functionalized to react with the crosslinking reagent. Representative of functionalized elastomers are, for example, styrene/butadiene elastomers containing one or more functional groups comprised of (A) amine functional group; (B) siloxy functional group, including end chain siloxy groups; (C) combination of amine and siloxy functional groups; (D) combination of thiol and siloxy (e.g., ethoxysilane) functional groups; (E) combination of imine and siloxy functional groups; and (F) hydroxyl functional groups.

In some embodiments, at least one diene polymer can be a silane functionalized elastomer characterized by a terminal functional group comprising a single silanol functional group or a polysiloxane block which has a single silanol end.

Non-limiting examples of functionalized elastomers that can be used in the disclosed rubber compound can include:

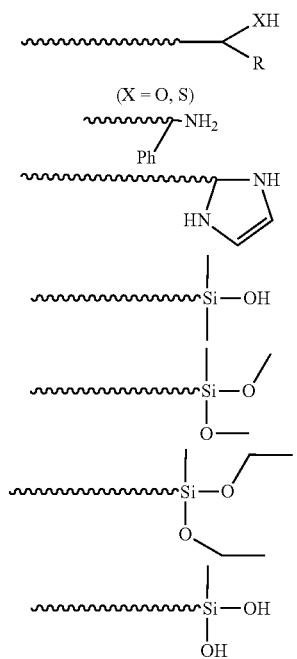

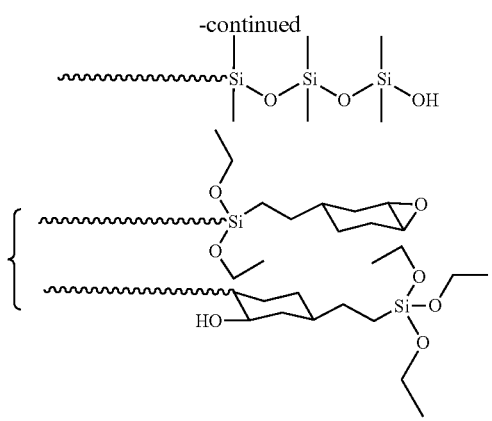

In one embodiment, the rubber composition may comprise from 0 to about 100 phr of a first rubber polymer (with which the crosslinking reagent reacts) and, more preferably, from about 10 to about 90 phr of the first polymer in a composition comprising at least two polymers. In one embodiment, an additional diene-based polymer is employed such that the composition comprises the combination of at least two polymers (synthetic and/or natural). In one embodiment, at least a third rubber polymer may be employed. In one embodiment, the first and optional second and additional elastomers, are provided in amounts that total 100 phr.

Another key ingredient to the disclosed rubber compound is a reinforcement filler comprising silica. The rubber compound may include from about 10 to about 180 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

A silica coated carbon black and/or commonly employed carbon blacks can also be used as filler in an amount ranging from 10 to 150 phr.

Other fillers may be used in the rubber composition including, but not limited to, carbon black; particulate fillers including ultra-high molecular weight polyethylene (UHMWPE); crosslinked particulate polymer gels; and plasticized starch composite filler. Such other fillers may make up a majority or minority of the filler system, or they can be used in equal parts with the silica.

The rubber composition may optionally include rubber processing oil. The rubber composition can include from 0 to about 100 phr of processing oil, which may be extending oil or freely added). Example oils mild extraction solvates (MES), treated distillate aromatic extracts (TDAE), residual aromatic extract (RAE), SRAE, and heavy napthenic oils (collectively "PCA oils" as are known in the art. In other embodiments, a suitable vegetable oil can be used, such as for example, soybean oil, sunflower oil, rapeseed oil, and canola oil which are in the form of esters containing a certain degree of unsaturation.

It is readily understood by those having skill in the art that the rubber composition of the tread rubber would be compounded by methods generally known in the rubber compounding art, such as mixing the various sulfur-vulcanizable constituent rubbers with variously commonly used additive materials such as, for example, curing aids, such as sulfur activators, retarders and accelerators, processing additives such (extending and freely added rubber processing) oils, resins including tackifying, traction, and thermoplastic resins and plasticizers, fillers, pigments, fatty acid, zinc acid, waxes, antioxidants and antiozonants (anti-degradants), peptizing agents and reinforcing materials. As known to those skilled in the art, depending on the intended use of the sulfur vulcanizable and sulfur vulcanized material (rubbers), the additives mentioned above are selected and commonly used in conventional amounts.

Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of resins can be added in a range of from about 0 to about 100 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. A typical peptizer may be, for example, dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

Other curatives may be used, including but not limited to from 0.5 to 5 phr of 1,6-bis(N,N' dibenzylthiocarbamoyldithio)-hexane available as Vulcuren from Lanxess.

The presence and relative amounts of the above additives are not considered to be an aspect of the present invention unless otherwise indicated, which is more primarily directed to a rubber compound made using a non-sulfur containing silane coupling agent. The rubber compound may be incorporated in a variety of rubber articles, including, for example, tire components, belts, pipes, hoses, fittings or footwear.

Representative of such tire component is, for example, a tire tread such including at least one of tread cap and/or tread base rubber layer tire sidewall, tire carcass component, such as, for example, a carcass cord ply coat, tire sidewall stiffening insert, an apex adjacent to or spaced apart from a tire bead, wire coat, inner liner tire chafer and/or tire bead component. The tread and/or tires can be built, shaped, molded and cured by various methods which will be readily apparent to those skilled in the art.

A pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias. In one embodiment, the tire component is intended to be ground-contacting. In another embodiment, the tire component is not ground contacting. In other embodiments, the rubber compound can be incorporated in a non-pneumatic tire.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

After mixing, the compounded rubber can be fabricated such as, for example, by extrusion through a suitable die to form a tire tread (including tread cap and tread base). The tire tread is typically built onto a sulfur curable tire carcass and the assembly thereof cured in a suitable mold under conditions of elevated temperature and pressure by methods well-known to those having skill in the art.

One aspect of the present disclosure, and particularly the silica-silane-polymer bond achieved through the independent siloxyl and crosslinking reactions, is that it allows for a greater number of combinations of elastomer and coupling agents to be employed in rubber compounds. This further provides for a limitless number of rubber compounds to be formed.

Another aspect, discussed infra, of the disclosed coupling system is that it allows for the removal or reduction of processing constraints, such as reaction temperature conditions, that were put in place for conventional coupling agents to prevent scorching. It is discovered that, by eliminating the active sulfur moiety in silane coupling agents and using the agent with a thiol-based crosslinking reagent, processability of a cured rubber compound is improved.

Example 1

In this example, the effect of the disclosed non-sulfur dual-functional silanes on the performance of a rubber compound is illustrated. Rubber compositions were mixed in a multi-step mixing procedure following the recipes in Table 1. Standard amounts of curatives and curing techniques were also used. The rubber compounds were then cured and tested for various properties including, inter alia, processing, stiffness, and rolling resistance, etc.

Control Sample A comprised a conventional sulfur-containing silane coupling agents. Experimental Sample B used the conventional organosilane of Sample A with an addition of 2 phr crosslinking reagent, with all other ingredients being the same. Experimental Sample C replaced the conventional organosilane coupling agent with a non-active sulfur containing silane coupling agent, with all other ingredients being the same as Control A. Experimental Samples D and E used the non-sulfur containing silane coupling agent of Sample C with the addition of increasing levels of crosslinking reagent, with all other ingredients being the same. Experimental Sample M (shown in FIG. 3) used the non-sulfur containing silane coupling agent of Sample C with a reduced level of crosslinking reagent by half over Sample D, with all other ingredients being the same.

The basic formulations are illustrated in the following Table 1, which is presented in parts per 100 parts by weight of elastomer (phr).

TABLE 1

| | Samples | | | | |
| --- | --- | --- | --- | --- | --- |
| | Control | Experimental | | | |
| | A | B | C | D | E |
| Non-Productive Stage | | | | | |
| SSBR | 70 | 70 | 70 | 70 | 70 |
| Polybutadiene | 30 | 30 | 30 | 30 | 30 |
| Silica | 65 | 65 | 65 | 65 | 65 |
| Coupling agent A[1] | 8 | 8 | 0 | 0 | 0 |
| Coupling agent B[2] | 0 | 0 | 8 | 8 | 8 |
| Crosslinking Reagent[3] | 0 | 2 | 0 | 1 | 2 |
| Curing Conditions | 10 min @ 170° C. | | | | |
| Processing | | | | | |
| RPA G' 0.83 H, 100° C., 15% | 0.22 | 0.21 | 0.22 | 0.24 | 0.29 |
| Stiffness | | | | | |
| RPA G' 1% | 1.33 | 1.06 | 1.80 | 1.92 | 1.80 |
| RPA G' 10% | 0.98 | 0.85 | 1.23 | 1.33 | 1.37 |
| RPA G' 50% | 0.62 | 0.59 | 0.72 | 0.76 | 0.81 |
| ARES G' 1% (60° C.) | 1.23E+06 | 1.16E+06 | 1.65E+06 | 2.10E+06 | 1.90E+06 |
| ARES G' 10% (60° C.) | 1.01E+06 | 9.58E+05 | 1.20E+06 | 1.46E+06 | 1.40E+06 |
| Wet | | | | | |
| Rebound 0° | 21.18 | 21.57 | 18.91 | 18.61 | 18.49 |
| Rolling Resistance | | | | | |
| Rebound 23° | 48.02 | 49.28 | 41.56 | 39.46 | 40.55 |
| Rebound 60° | 61.44 | 62.99 | 57.52 | 57.52 | 59.04 |
| Rebound 100° | 68.10 | 69.20 | 64.85 | 65.54 | 67.61 |
| RPA TD 10% | 0.097 | 0.089 | 0.103 | 0.102 | 0.084 |
| RPA TD 10%, 2$^{nd}$ | 0.094 | 0.090 | 0.109 | 0.108 | 0.092 |
| ARES TD 10% 60° C. | 0.103 | 0.102 | 0.138 | 0.148 | 0.137 |
| C&F | | | | | |
| 100% Modulus (23° C.) | 1.32 | 1.26 | 1.38 | 1.38 | 1.80 |
| 300% Modulus (23° C.) | 6.18 | 7.27 | 6.84 | 6.75 | 10.99 |
| M300/M100 | 4.68 | 5.77 | 4.96 | 4.89 | 6.11 |
| Tensile (23) | 12.56 | 16.59 | 12.28 | 15.94 | 11.57 |
| Elongation (23) | 475 | 501 | 510 | 515 | 309 |
| True Tensile | 53.00 | 71.29 | 67.60 | 70.80 | 32.04 |

TABLE 1-continued

| | Samples | | | | |
|---|---|---|---|---|---|
| | Control | Experimental | | | |
| | A | B | C | D | E |
| TW | | | | | |
| Delta Torque MDR 170° C. | 8.95 | 8.79 | 11.10 | 12.16 | 11.88 |
| T25 MDR 170° C. | 1.88 | 0.86 | 1.42 | 1.44 | 1.31 |
| T90 MDR 170° C. | 4.33 | 3.12 | 2.67 | 2.89 | 2.65 |
| C&F | | | | | |
| 50% Modulus (23° C.) | 0.82 | 0.77 | 0.87 | 0.88 | 1.08 |
| 100% Modulus (23° C.) | 1.32 | 1.26 | 1.38 | 1.38 | 1.80 |
| 200% Modulus (23° C.) | 3.17 | 3.41 | 3.47 | 3.34 | 5.22 |
| M200/M100 | 2.40 | 2.71 | 2.51 | 2.42 | 2.90 |
| 300% Modulus (23° C.) | 6.18 | 7.27 | 6.84 | 6.75 | 10.99 |
| Snow | | | | | |
| G'/@ −20 RE S Temp. Sweep | 5.86E±06 | 6.02E±06 | 1.04E±07 | 1.10E±07 | 1.19E±07 |
| Wet | | | | | |
| TD @ 0 ARES S Temp. Sweep | 0.317 | 0.335 | 0.387 | 0.372 | 0.371 |
| Wear | | | | | |
| Din Abrasion (144) | 131 | 44 | 52 | 51 | 59 |

Figure 3:
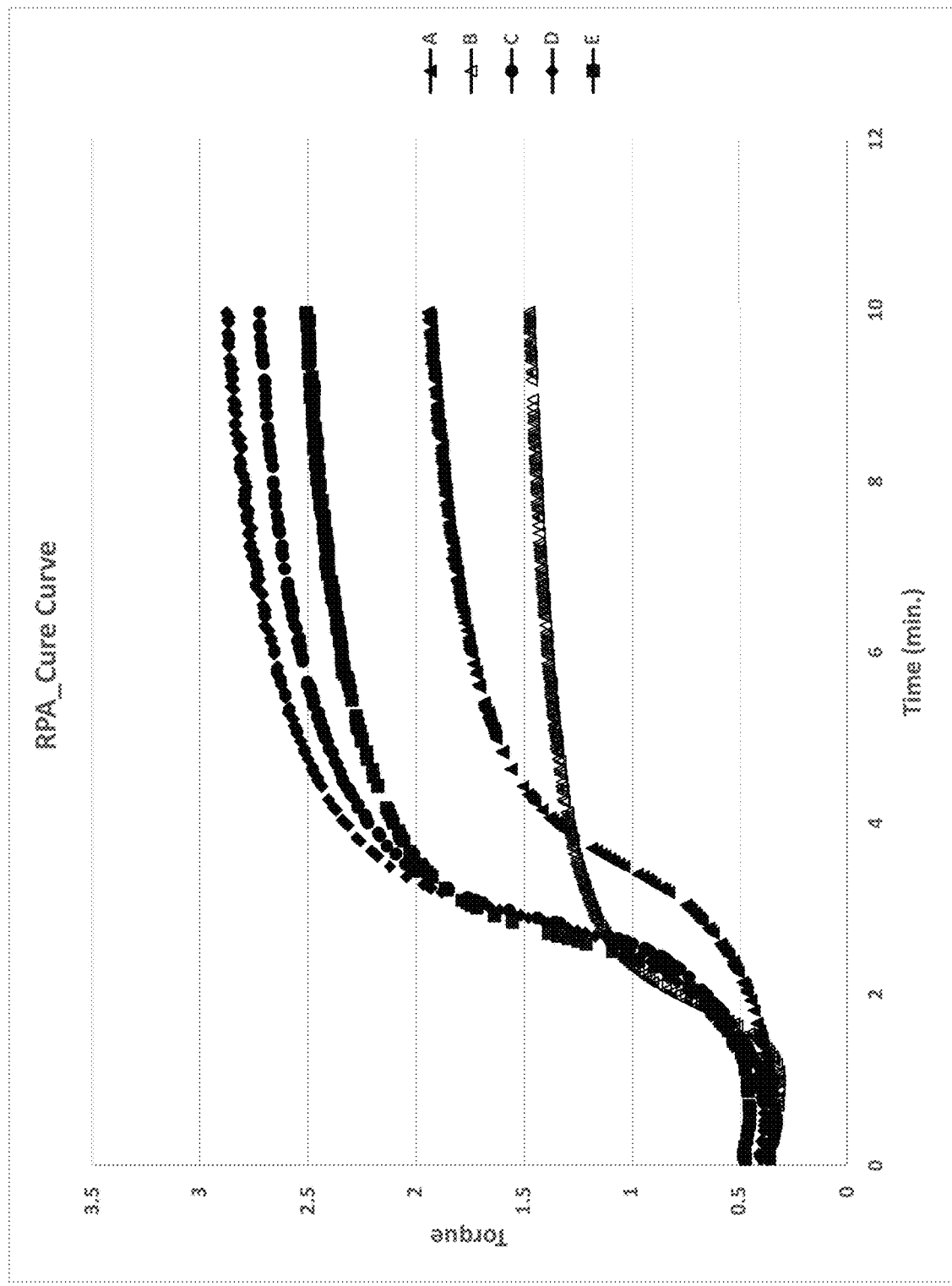
FIG. 3 shows a plot of relative Torque values over Time for the individual Control and Experimental rubber Samples for the first series (Samples A-E) of experiments.

[1] S-(Octanoyl)mercaptopropyltriethoxysilane obtained as NXT Silane from Momentive
[2] (3-Glycidoxypropyl)triethoxysilane FIG. 3 shows a plot of relative Torque values over Time for the individual Control and Experimental rubber Samples A-E, and further includes a plot for M. From FIG. 3, it can be determined when Samples A-E and M begin curing—i.e., their scorch times. It is shown that Experimental Samples B-E, M (each containing a non-active sulfur containing silane) begin curing sooner than Control A and that Samples B, D, E, M (each containing the crosslinking reagent) begin curing sooner than the Samples A, C (omitting the crosslinking reagents). FIG. 3 further displays that scorch is not affected by (e.g., doubling or halving) the level of crosslinking reagent. Thus, the results show that Experimental Samples D, E, and M display the best processing/curing conditions.

The results in Table 1 also show that RPAs G' at 1% and 50% are substantially higher than the Control A, thus indicating that the Experimental Samples D and E display the best stiffness among the samples. Indeed, Sample E further demonstrates improved rolling resistance over Control A. It is concluded that a combination of the disclosed non-sulfur (or non-active sulfur) containing silane coupling agent and crosslinking reagent, and a rubber compound containing the same, improve performance over conventional compounds.

The results in Table 1 further demonstrate a higher stiffness and lower rolling resistance for Samples D and E over Sample C, thus indicating that the addition of the crosslinking reagent to a compound comprising a non-active sulfur containing silane coupling agent improves performance over a compound in which a crosslinking reagent is absent. The full compound physical properties are listed in table.

Example 2

In this example, the effect of the disclosed non-sulfur dual-functional silanes on the performance of a rubber compound is illustrated. Rubber compositions were mixed in a multi-step mixing procedure following the recipes in Table 2. Standard amounts of curatives and curing techniques were also used. The rubber compounds were then cured and tested for various properties including, inter alia, processing, stiffness, and rolling resistance, etc.

Control Sample F comprised a conventional sulfur-containing silane coupling agent. Control Sample G comprised a different conventional sulfur-containing silane coupling agent, with all other ingredients being the same as Control F. Experimental Samples H and K each replaced the conventional organosilane coupling agents with a non-active sulfur containing silane coupling agent, with all other ingredients being the same as Control F. Experimental Sample I used the non-sulfur containing silane coupling agent of Sample H with the addition of a crosslinking reagent, with all other ingredients being the same. Experimental Sample J replaced the non-sulfur containing silane coupling agent of Sample I, with all other ingredients being the same as Sample I. Experimental Sample L used the non-sulfur containing silane coupling agent of Sample K with the addition of a crosslinking reagent, with all other ingredients being the same.

The basic formulations are illustrated in the following Table 1, which is presented in parts per 100 parts by weight of elastomer (phr).

TABLE 2

| | Samples | | | | | | |
|---|---|---|---|---|---|---|---|
| | Control | | | Experimental | | | |
| | F | G | H | I | J | K | L |
| Non-Productive Stages | | | | | | | |
| SSBR | 70 | 70 | 70 | 70 | 70 | 70 | 70 |
| Polybutadiene | 30 | 30 | 30 | 30 | 30 | 30 | 30 |
| Silica | 65 | 65 | 65 | 65 | 65 | 65 | 65 |
| Coupling agent A[1] | 8 | 0 | 0 | 0 | 0 | 0 | 0 |
| Coupling agent B[2] | 0 | 8 | 0 | 0 | 0 | 0 | 0 |
| Coupling agent C[3] | 0 | 0 | 8 | 8 | 0 | 0 | 0 |
| Coupling agent D[4] | 0 | 0 | 0 | 0 | 8 | 0 | 0 |
| Coupling agent E[5] | 0 | 0 | 0 | 0 | 0 | 8 | 8 |
| Crosslinking Reagent[5] | 0 | 0 | 0 | 1.8 | 1.8 | 0 | 1.8 |
| Processing | | | | | | | |
| RPA G' 0.83 H, 100° C, 15% Stiffness (higher better) | 0.22 | 0.19 | 0.19 | 0.22 | 0.24 | 0.21 | 0.42 |
| RPA G' 1% | 1.84 | 1.35 | 1.53 | 1.36 | 1.51 | 2.09 | 1.68 |
| RPA G' 50% | 0.77 | 0.70 | 0.70 | 0.76 | 0.76 | 0.74 | 0.80 |
| Rolling Resistance (lower better) | | | | | | | |
| RPA TD 10% | 0.109 | 0.086 | 0.102 | 0.078 | 0.087 | 0.128 | 0.093 |

[1] Bis[3-triethoxysilyl)propyl]disulfide obtained as Si75 from Chemspec LTD
[2] S-(Octanoyl)mercaptopropyltriethoxysilane obtained as NXT Silane from Momentive
[3] 3-glycidoxypropyl diethoxy silane (GPMDES)
[4] 3-glycidoxypropyltriethoxysilane (GPTES)
[5] 2-(3,4-epoxycyclohexyl)ethyltriethoxysilane (ECETES)
[6] trimethylolpropane tris(3-mercaptopropionate).

Figure 4:
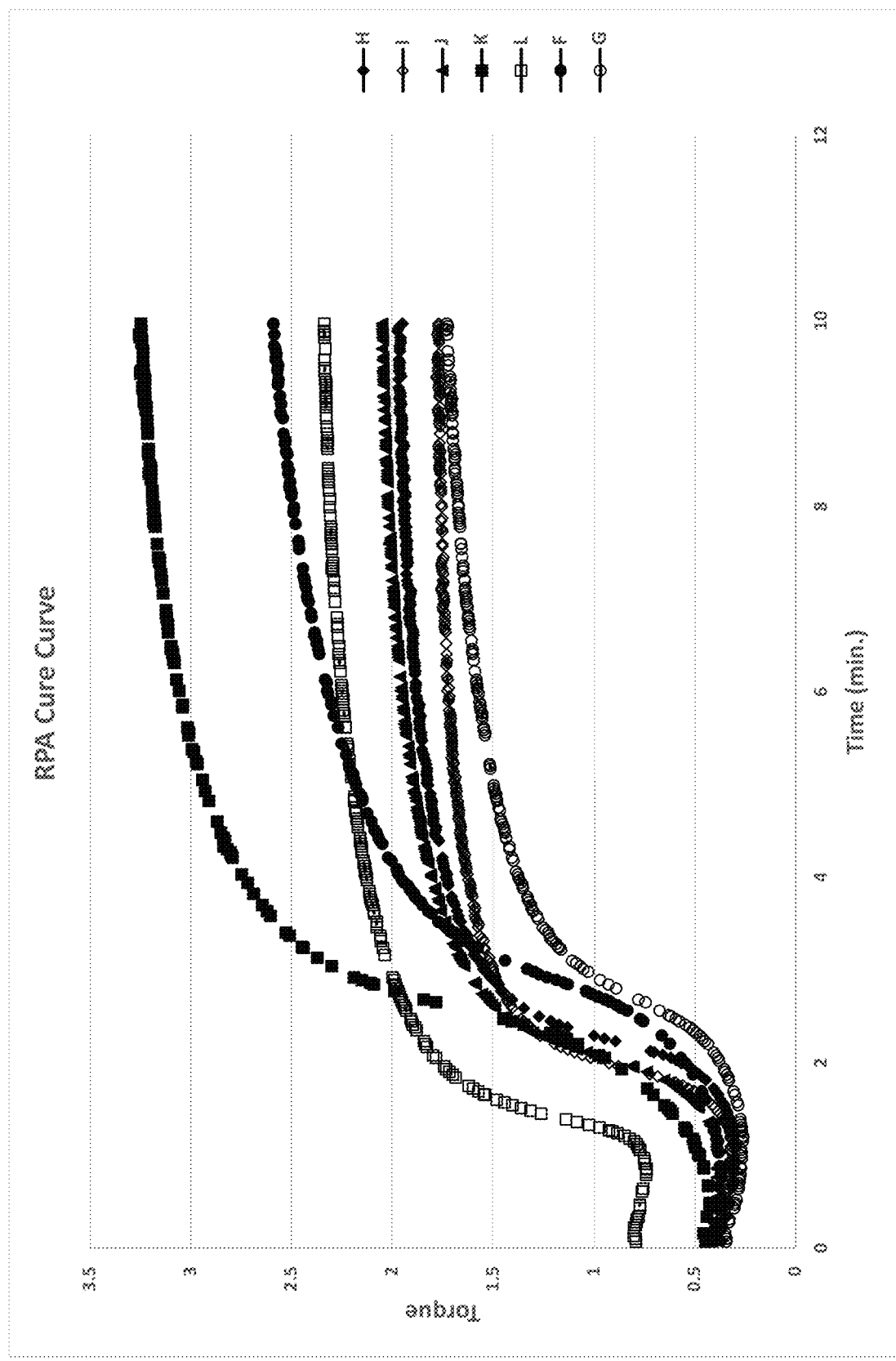
FIG. 4 shows a plot of relative Torque values over Time for the individual Control and Experimental rubber Samples for the second series (Samples F-J) of experiments.

FIG. 4 shows a plot of relative Torque values over Time for the individual Controls and Experimental rubber Samples F-J. From FIG. 4, it can be determined when Samples F-J begin curing—i.e., their scorch times. It is shown that Experimental Samples I and J (each containing a non-active sulfur containing silane and the crosslinking reagent) begin curing sooner than Controls A and B. FIG. 4 further displays that scorch is not affected by the type of non-active sulfur containing silane used. Thus, the results show that Experimental Samples I and J display improved processing/curing conditions.

The results in Table 1 also show that RPAs G' at 1% and 50% approaches and/or improves over Control G, thus indicating that the Experimental Samples I, J and L display the best stiffness among the Experimental Samples. Indeed, Samples I, J and L further demonstrates improved rolling resistance over Controls F and G. It is concluded that a combination of the disclosed non-sulfur (or non-active sulfur) containing silane coupling agent and crosslinking reagent, and a rubber compound containing the same, improve performance over conventional compounds.

This means that the processing and performance of the disclosed rubber compound (formed from a crosslinking reagent and a coupling agent without an active sulfur moiety) is significantly improved (if not roughly the same) as that for a vehicle tire having a tread of the conventional rubber compound (formed from a sulfur containing silane coupling agent).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A coupling system for use in a vulcanizable silica-filled rubber composition, the coupling system comprising:
   a non-active sulfur containing silane coupling agent for reacting with an associated precipitated silica to produce a hydrophobic silica; and
   a crosslinking reagent for reacting with the non-active sulfur containing silane coupling agent and an associated polymer.

2. The coupling system of claim 1, wherein the crosslinking reagent is a bis- or multi-thiol crosslinking reagent.

3. The coupling system of claim 1, wherein the crosslinking reagent is trimethylolpropane tris(3-mercaptopropionate).

4. The coupling system of claim 1, wherein the associated polymer is not functionalized.

5. The coupling system of claim 1, wherein the associated polymer is functionalized.

6. The coupling system of claim 1, wherein the non-active sulfur containing silane coupling agent comprises at least one end terminating group reactive with a hydroxyl group contained on the associated precipitated silica and at least one end terminating group reactive with a thiol moiety contained on the crosslinking reagent.

7. The coupling system of claim 1, wherein the crosslinking reagent comprises at least two thiol moeity reactive with the non-active sulfur containing silane coupling reagent and at least a second moiety reactive with a diene-based polymer.

8. The coupling system of claim 1, wherein the non-active sulfur containing silane coupling agent is a dual-functional organic silane having the general formula A-R-B, wherein A is selected from a group comprising an alkoxy, cycloalkoxy, and phenoxy groups;

R is a hydrocarbon chain having from one to 10 carbon atoms, a heteroatom-containing (O, N, P) hydrocarbon, or a ring group; and B is a vinyl-, cyano-, epoxy-, acryloxy-, methacryloxy-, cyclopentadienyl- or isocyanyl groups capable of bonding to a thiol of the crosslinking reagent.

9. A rubber composition produced using the crosslinking system of claim 1, the rubber composition further comprising:
   a filler comprising at least silica; and
   a diene-based polymer.

10. A vulcanizable silica-filled rubber compound, comprising:
   a diene-based polymer;
   a filler comprising at least precipitated silica;
   a non-active sulfur containing silane coupling agent comprising at least one end terminating group reactive with a hydroxyl group contained on the silica; and
   a crosslinking reagent comprising at least one end terminating group reactive with a functional moiety contained on the non-active sulfur containing silane coupling agent and at least a second end terminating group reactive with the diene-based polymer.

11. The rubber compound of claim 10, wherein the polymer is not functionalized.

12. The rubber compound of claim 10, wherein the polymer is functionalized.

13. The rubber compound of claim 10, wherein the crosslinking reagent is a thiol.

14. The rubber compound of claim 10, wherein the crosslinking reagent is trimethylolpropane tris(3-mercaptopropionate).

15. The rubber compound of claim 10, wherein the rubber compound is a reaction product of a silanization reaction between the silica and the non-active sulfur containing silane coupling agent; a first crosslinking reaction between the crosslinking reagent and the non-active sulfur containing silane coupling agent; and a second crosslinking reaction between the crosslinking reagent and the polymer.

16. The rubber compound of claim 10, wherein the non-active sulfur containing silane coupling agent has the general formulae A-R-B, wherein each A represents a moiety capable of bonding to the silica and B represents a moiety capable of bonding to the crosslinking reagent, and R is optionally a hydrocarbon chain, a heteroatom-containing (O, N, P) hydrocarbon, or a ring group, the hydrocarbon having between 1 and 10 carbons.

17. The rubber compound of claim 10, wherein the rubber compound is incorporated in a tire component, belt, pipe, hose, fitting or footwear.

* * * * *